(12) United States Patent
Kim et al.

(10) Patent No.: US 8,824,590 B2
(45) Date of Patent: Sep. 2, 2014

(54) LAYERED TRANSMISSION APPARATUS AND METHOD, RECEPTION APPARATUS AND RECEPTION METHOD

(75) Inventors: Seong Rag Kim, Daejeon (KR); Seuck Ho Won, Daejeon (KR); Jung-Im Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 372 days.

(21) Appl. No.: 13/024,867

(22) Filed: Feb. 10, 2011

(65) Prior Publication Data
US 2011/0194643 A1 Aug. 11, 2011

(30) Foreign Application Priority Data

Feb. 11, 2010 (KR) .................. 10-2010-0012700
Mar. 29, 2010 (KR) .................. 10-2010-0027928
Mar. 29, 2010 (KR) .................. 10-2010-0027929
Mar. 29, 2010 (KR) .................. 10-2010-0027931
Feb. 10, 2011 (KR) .................. 10-2011-0011881

(51) Int. Cl.
*H04L 27/00* (2006.01)
*H04L 1/00* (2006.01)
*H04L 27/34* (2006.01)
*H04L 25/03* (2006.01)

(52) U.S. Cl.
CPC ..... *H04L 27/3488* (2013.01); *H04L 2025/0342* (2013.01); *H04L 1/007* (2013.01); *H04L 25/03197* (2013.01)
USPC ........................................................ 375/295

(58) Field of Classification Search
CPC ... H04L 1/0003; H04L 1/0071; H04L 5/0007; H04L 1/0009

USPC .................................................. 375/295, 260
See application file for complete search history.

(56) References Cited

U.S. PATENT DOCUMENTS

| | | | |
|---|---|---|---|
| 5,392,299 A | 2/1995 | Rhines et al. | |
| 5,732,093 A | 3/1998 | Huang | |
| 6,275,531 B1 | 8/2001 | Li | |
| 7,079,607 B2 * | 7/2006 | Brunel | 375/346 |
| 7,272,162 B2 * | 9/2007 | Sano et al. | 375/135 |
| RE41,001 E * | 11/2009 | Oshima et al. | 375/219 |
| 7,630,451 B2 * | 12/2009 | Collins et al. | 375/261 |

(Continued)

FOREIGN PATENT DOCUMENTS

EP 2541919 1/2013

OTHER PUBLICATIONS

U.S. Patent Office Action mailed Feb. 15, 2013 in co-pending U.S. Appl. No. 13/024,867.

(Continued)

*Primary Examiner* — Daniel Washburn
*Assistant Examiner* — Berhanu Tadese
(74) *Attorney, Agent, or Firm* — Staas & Halsey LLP (57) ABSTRACT

A layered transmission apparatus transmitting information regarding a plurality of layers includes: coding units coding an information bit of a corresponding layer to generate code bits; bit interleaving units bit-interleaving a corresponding code bit to generate interleaved symbols; a modulation unit classifying layers into layer groups, and modulating interleaved symbols corresponding to each of the groups to generate a modulation symbol of each of the groups; a gain control unit controlling gain of the modulation symbol of each of the groups; and an adding unit adding gain-controlled modulation symbols of the groups to generate a transmission symbol.

12 Claims, 4 Drawing Sheets

(56) References Cited

U.S. PATENT DOCUMENTS

| | | | |
|---|---|---|---|
| 8,085,862 B2 | 12/2011 | Wang | |
| 8,102,921 B2* | 1/2012 | Suh et al. | 375/240.27 |
| 8,248,910 B2* | 8/2012 | Jokela et al. | 370/208 |
| 8,432,980 B2* | 4/2013 | Yang et al. | 375/260 |
| 2002/0118742 A1 | 8/2002 | Puri et al. | |
| 2002/0181604 A1 | 12/2002 | Chen | |
| 2004/0136469 A1 | 7/2004 | Wang | |
| 2005/0259729 A1 | 11/2005 | Sun | |
| 2005/0265616 A1 | 12/2005 | Rose | |
| 2006/0062314 A1* | 3/2006 | Palin et al. | 375/260 |
| 2006/0153315 A1 | 7/2006 | Chen et al. | |
| 2006/0256708 A1 | 11/2006 | Wang et al. | |
| 2007/0025283 A1* | 2/2007 | Koslov | 370/316 |
| 2007/0098162 A1 | 5/2007 | Shin | |
| 2007/0141991 A1 | 6/2007 | Hong et al. | |
| 2007/0195878 A1* | 8/2007 | Bruls et al. | 375/240.1 |
| 2007/0229344 A1 | 10/2007 | Meyer et al. | |
| 2007/0245204 A1* | 10/2007 | Yomo et al. | 714/749 |
| 2008/0095235 A1 | 4/2008 | Hsiang | |
| 2008/0170636 A1* | 7/2008 | Han | 375/261 |
| 2008/0225964 A1* | 9/2008 | Han et al. | 375/260 |
| 2008/0317142 A1 | 12/2008 | Wang et al. | |
| 2009/0022237 A1* | 1/2009 | Wang et al. | 375/260 |
| 2009/0238286 A1* | 9/2009 | Kim et al. | 375/240.27 |
| 2009/0285155 A1* | 11/2009 | Scarpa et al. | 370/326 |
| 2010/0046675 A1* | 2/2010 | Collins et al. | 375/340 |
| 2010/0146141 A1* | 6/2010 | Lim et al. | 709/231 |
| 2010/0157940 A1* | 6/2010 | Shitara | 370/331 |
| 2010/0246719 A1* | 9/2010 | Ko et al. | 375/303 |
| 2011/0013718 A1* | 1/2011 | Ko et al. | 375/295 |
| 2011/0194645 A1 | 8/2011 | Kim et al. | |
| 2011/0286535 A1* | 11/2011 | Ko et al. | 375/259 |
| 2011/0305300 A1* | 12/2011 | Ko | 375/298 |
| 2012/0243561 A1* | 9/2012 | Loghin et al. | 370/537 |
| 2012/0243618 A1* | 9/2012 | Suh et al. | 375/240.26 |
| 2013/0010680 A1 | 1/2013 | Senarath et al. | |

OTHER PUBLICATIONS

U.S. Patent Office Action mailed Feb. 1, 2013 in co-pending U.S. Appl. No. 13/025,742.
U.S. Patent Office Action mailed Feb. 15, 2013 in co-pending U.S. Appl. No. 13/025,642.
U.S. Appl. No. 13/024,867, filed Feb. 11, 2011, Seong Rag Kim, Electronics and Telecommunications Research Institute.
U.S. Appl. No. 13/024,867, filed Feb. 10, 2011, Seong Rag Kim, Electronics and Telecommunications Research Institute.
U.S. Appl. No. 13/025,742, filed Feb. 11, 2011, Seong Rag Kim, Electronics and Telecommunications Research Institute.
U.S. Patent Office Action mailed May 13, 2013 in co-pending U.S. Appl. No. 13/025,742.
U.S. Patent Office Action mailed Apr. 11, 2013 in co-pending U.S. Appl. No. 13/025,756.
U.S. Office Action mailed Aug. 28, 2013 in corresponding U.S. Appl. No. 13/025,642.
Notice of Allowance mailed Nov. 6, 2013 in corresponding U.S. Appl. No. 13/025,642.
ETSI EN 300 744 v1.6.1 (Jan. 2009), "Digital Video Broadcasting (DVB); Framing Structure, Channel Coding and Modulation for Digital Terrestrial Television".
U.S. Office Action mailed Aug. 26, 2013 in corresponding U.S. Appl. No. 13/025,742.
U.S. Office Action mailed Oct. 4, 2013 in corresponding U.S. Appl. No. 13/025,756.
Fischer, Robert F. H et al., "Adaptive Interleaving for Bit-Interleaved Coded Modulation," Source and Channel Coding (SCC), 2008 7th International ITG Conference on, vol., No., pp. 1, 6, Jan. 14-16, 2008.
J. Tan and G. Stuber, "Analysis and Design of Interleaver Mappings for Iteratively Decoded BICM," in IEEE International Conference on Communications, ICC 2002, New York, USA, May 2002.
Final Office Action dated Jun. 17, 2014 in co-pending U.S. Appl. No. 13/025,756.

* cited by examiner

LAYERED TRANSMISSION APPARATUS AND METHOD, RECEPTION APPARATUS AND RECEPTION METHOD

CROSS-REFERENCE TO RELATED APPLICATION

This application claims priority to and the benefit of Korean Patent Application No. 10-2010-0012700, 10-2010-0027931, 10-2010-0027929, 10-2010-0027928 and 10-2011-0011881 filed in the Korean Intellectual Property Office on Feb. 11, 2010, Mar. 29, 2010, Mar. 29, 2010, Mar. 29, 2010 and Feb. 10, 2011, the entire contents of which are incorporated herein by reference.

BACKGROUND OF THE INVENTION (a) Field of the Invention

The present invention relates to a layered transmission apparatus and method, a reception apparatus, and a reception method.

(b) Description of the Related Art

A broadcasting system, providing diverse video qualities, transmits scalable video coded image information so as to be compatible with reception apparatuses having various performances. A scalable video coding (SVC) is classifying information into a plurality of layers according to the significance of image information and transmitting the same. When a transmitter performs layered transmission to effectively transmit image information using the SVC technique, a receiver reproduces the layers according to desired image quality or device performance.

A layer modulation technique, a typical technique among layered transmission techniques, modulates video information by layer and transmits the same. Layer modulation is a scheme of transmitting a base layer and an enhancement layer, and when the layer modulation scheme uses 16QAM (Quadrature Amplitude Modulation), it can transmit two layers. Thus, in order for the transmitter to transmit more layers, a modulation order must be increased; however, in this case, the coverage is reduced and reception performance is possibly drastically degraded. In addition, the reception apparatus hitherto performs demodulation by layer, causing inter-layer interference. So, in order to solve this problem, if the transmitter assigns more transmission power to the base layer than that to the enhancement layer to reduce inter-layer interference, the distance between constellation points of the enhancement layer would become narrow, making it difficult to transmit two or more layers.

SUMMARY OF THE INVENTION

The present invention has been made in an effort to provide a layered transmission apparatus and method, a reception apparatus, and a reception method having advantages of increasing the number of simultaneously transmittable layers of scalable video coding by using a multi-dimensional lattice, and simultaneously estimating symbol metrics of all the layers from received signals.

An exemplary embodiment of the present invention provides a layered transmission apparatus for transmitting information regarding a plurality of layers, including: a plurality of coding units, which correspond to each of the plurality of layers, configured to code an information bit of a corresponding layer to generate code bits; a plurality of bit interleaving units, which correspond to each of the code bits, configured to bit-interleave a corresponding code bit to generate interleaved symbols; a modulation unit configured to classify the plurality of layers into a plurality of layer groups, and modulate the plurality of the interleaved symbols corresponding to each of the layer groups to generate a modulation symbol of each of the layer groups; a gain control unit configured to control the gain of the modulation symbol of each of the layer groups; and an adding unit configured to add the gain-controlled modulation symbols of the plurality of layer groups to generate a transmission symbol.

The modulation unit may include a plurality of mapping units, which correspond to each of the plurality of layers, configured to map the interleaved symbol of a corresponding layer to bits for modulation; and a plurality of multi-dimensional modulation units which correspond to each of the plurality of layer groups, wherein each of the multi-dimensional modulation units may modulate a combined signal obtained by combining output signals from mapping units belonging to a corresponding layer group, among the plurality of mapping units, to generate the modulation symbol.

The modulation unit may further include a plurality of modulo calculation units, which correspond to each of the plurality of layer groups, wherein each of the modulo calculation units may add output signals from the mapping units belonging to the corresponding layer group and perform a modulo calculation to generate the combined signal.

The mapping units may use gray mapping.

Each of the multi-dimensional modulation units may generate a plurality of symbols from the combined signal of the corresponding layer group, and combine the plurality of symbols to generate an N-dimensional modulation symbol of the corresponding layer group, and may modulate some bits of the combined signal such that they correspond to an M-dimensional lattice, to generate the respective symbols, wherein N is a natural number greater than M.

The adding unit may add symbols of the same positions among the gain-controlled modulation symbols of the plurality of layer groups to generate the transmission symbol.

Another embodiment of the present invention provides a reception apparatus including: a symbol metric estimation unit configured to estimate a symbol metric of a layer transmission signal received from a layered transmission apparatus; a plurality of bit metric calculation units configured to calculate a bit metric corresponding to an interleaved bit generated from the layered transmission apparatus based on the estimated symbol metric; a plurality of deinterleaving units configured to calculate a code bit metric based on the bit metric; a plurality of layer symbol metric calculation units, which correspond to each of the plurality of layers, configured to calculate a symbol metric of the corresponding layer based on the code bit metric of the corresponding layer; and a plurality of decoding units, which correspond to each of the plurality of layers, configured to decode an information bit of the corresponding layer based on the symbol metric of the corresponding layer.

The symbol metric estimation unit may estimate the symbol metric based on channel information between the layered transmission apparatus and the reception apparatus and the layer transmission signal.

Each of the bit metric calculation units may obtain symbols related to the interleaved bit among the estimated symbol metric, and determine a symbol closest to the layer transmission signal, among the related symbols, as a bit metric corresponding to the interleaved bit.

Yet another embodiment of the present invention provides a method for transmitting information regarding a plurality of layers by a layered transmission apparatus, including: coding an information bit of a corresponding layer among the plurality of layers to generate code bits; bit-interleaving each code bit to generate an interleaved bit; classifying the plurality of layers into a plurality of layer groups and generating a modulation symbol of each layer group based on the interleaved bits corresponding to each layer group; controlling the gain of the modulation symbol by layer group; and adding the gain-controlled modulation symbols of the plurality of layer groups to generate a transmission symbol.

The generating of the modulation symbol of each layer group may include: mapping the interleaved bits of the corresponding layer to bits for modulation; and modulating a combined signal obtained by combining the mapped bits corresponding to the respective layer groups to generate a modulation symbol which has been multi-dimensionally modulated.

The generating of the modulation symbol of each layer group may further include: adding the mapped bits of the layers belonging to each layer group and perform a modulo calculation to generate the combined signal.

In the mapping, gray mapping may be used.

In the generating of the multi-dimensionally modulated modulation symbol, a plurality of symbols may be generated from the combined signal, and the plurality of symbols may be combined to generate an N-dimensional modulation symbol of each layer group, and some bits of the combined signal may be modulated to correspond to an M-dimensional, which is lower than N dimension, lattice to generate each symbol.

In the generating of the transmission symbol, the transmission symbol may be generated by adding symbols at the same positions among the gain-controlled modulation symbols of the plurality of layer groups.

Still another embodiment of the present invention provides a method for receiving a layer transmission signal transmitted from a layered transmission apparatus by a reception apparatus, including: estimating a symbol metric of the layer transmission signal based on the received layer transmission signal; calculating a bit metric corresponding to an interleaved bit generated by the layered transmission apparatus based on the estimated symbol metric; deinterleaving the bit metric to calculate a code bit metric; calculating a symbol metric of the corresponding layer based on the code bit metric of the corresponding layer among the plurality of layers; and decoding an information bit of the corresponding layer based on the symbol metric of the corresponding layer.

In the estimating of the symbol metric, the symbol metric transmitted by the layered transmission apparatus may be estimated based on channel information between the layered transmission apparatus and the reception apparatus and the layer transmission signal.

In the calculating of the bit metric of the corresponding layer, the bit metric corresponding to the interleaved bit may be calculated based on the difference between the symbols related to the interleaved bit among the estimated symbol metric and the layer transmission signal.

According to an embodiment of the present invention, the number of layers which can be simultaneously transmitted can be increased, and because symbol metrics of all the layers are simultaneously estimated from a received signal and decoding is performed by layer, interlayer interference can be reduced.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

A layered transmission apparatus and method, a reception apparatus, and a reception method according to exemplary embodiments of the present invention will now be described with reference to the accompanying drawings.

Figure 1:
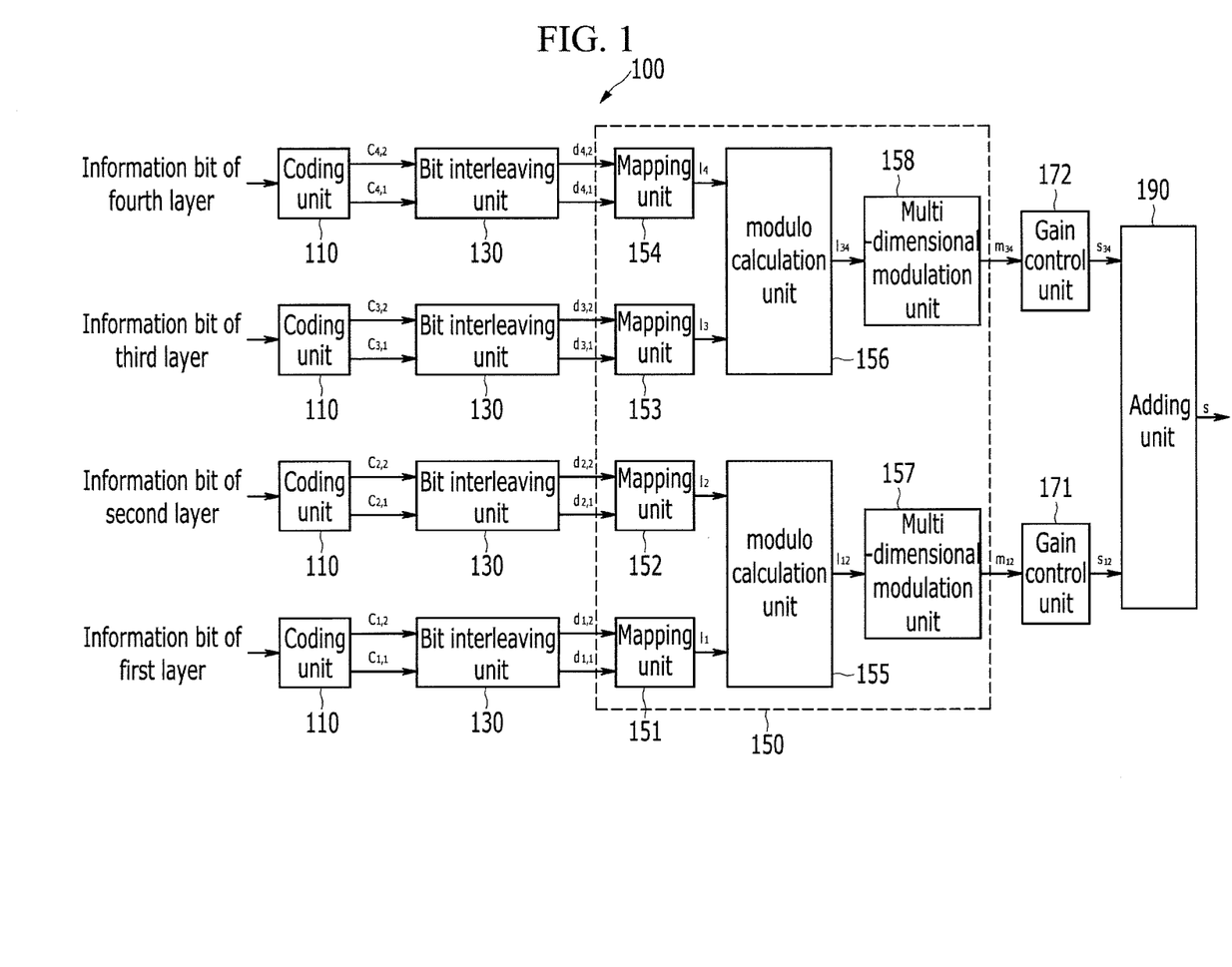
FIG. 1 is a schematic block diagram of a layered transmission apparatus according to an exemplary embodiment of the present invention.

FIG. 1 is a schematic block diagram of a layered transmission apparatus according to an exemplary embodiment of the present invention.

With reference to FIG. 1, a layered transmission apparatus 100 performs scalable video coding (SVC) on image information into L (L is a natural number) number of layers including a base layer and an enhancement layer and transmits the same. In this case, the layered transmission apparatus 100 simultaneously transmits the L number of layers by using a multi-dimensional lattice. The layered transmission apparatus 100 includes a plurality of coding units 110, a plurality of bit interleaving units 130, a modulation unit 150, gain control units 171 and 172, and an adding unit 190.

The plurality of coding units 110 correspond to each of the plurality of layers, and each of the coding units 110 codes an information bit of a corresponding layer. The plurality of bit interleaving units 130 correspond to each of code bits of a plurality of layers, and each of the bit interleaving units 130 interleaves corresponding code bits in units of bits. The modulation unit 150 groups a plurality of layers to multi-dimensionally modulate them. The modulation unit 150 includes a plurality of mapping units 151, 152, 153, and 154 corresponding to a plurality of layers, respectively, a plurality of modulo calculation units 155 and 156 corresponding to a plurality of layer groups, respectively, and a plurality of multi-dimensional modulation units 157 and 158 corresponding to the plurality of layer groups. Hereinafter, a case in which the layered transmission apparatus 100 transmits four layers (L=4) will be described as an example.

The plurality of coding units 110 code an information bit of a corresponding layer at a certain code rate to generate code bits. For example, when the code rate is ½, the plurality of coding units 110 receive 1 information bit by layer and generate two code bits ($c_{1,1}, C_{1,2}, c_{2,1}, c_{2,2}, C_{3,1}, c_{3,2}, c_{4,1}, c_{4,2}$) by layer.

The plurality of bit interleaving units 130 bit-interleave the code bits ($c_{1,1}, c_{1,2}, C_{2,1}, C_{2,2}, c_{3,1}, c_{3,2}, c_{4,1}, C_{4,2}$), which have been generated by the corresponding coding units 110, to generate interleaved bits ($d_{1,1}, d_{1,2}, d_{2,1}, d_{2,2}, d_{3,1}, d_{3,2}, d_{4,1}, d_{4,2}$).

The modulation unit 150 classifies the L number of layers into a plurality of layer groups such that one layer group includes at least two layers, and modulates the interleaved bit information corresponding to each of the layer groups to generate modulated symbols corresponding to each of the layer groups. In this case, the modulated symbols corresponding to each of the layer groups include a plurality of symbols combined for a multi-dimensional modulation, which are called a plurality of symbol combination information. The number of layers included in the respective layer groups may vary depending on a modulation scheme and the number of input bits of the modulation unit 150. For example, when the layered transmission apparatus 100 transmits four layers, the modulation unit 150 may group two lower layers, among the four layers, to classify them into one layer group, and group the other two remaining upper layers to classify them into another layer group, and modulates them. To this end, the modulation unit 150 includes a plurality of mapping units 151, 152, 153, and 154 corresponding to the plurality of layers, a plurality of modulo calculation units 155 and 156 corresponding to the plurality of layer groups, and the multi-dimensional modulation units 157 and 158 corresponding to the plurality of layer groups. The respective multi-dimensional modulation units 157 and 158 generate a plurality of symbols from signals delivered from the corresponding modulo calculation units 155 and 156, and combine the plurality of symbols to generate N-dimensional modulation symbols of the corresponding layer groups. In this case, the respective multi-dimensional modulation units 157 and 158 modulate some bits of the delivered signals such that they correspond to an M-dimensional lattice (M is a natural number smaller than N), to generate respective symbols.

First, modulation of the lower layer group including the two lower layers will now be described. The mapping unit 151 of the first layer and the mapping unit 152 of the second layer map the input interleaved bits $[d_{1,1}\ d_{1,2}]$ and $[d_{2,1}\ d_{2,2}]$ to bits for modulation, i.e., modulation bits $I_1$ and $I_2$, respectively. In this case, the modulation bits $I_1$ and $I_2$ are the mapped bits $I_1$ and $I_2$ respectively. For a multi-dimensional modulation, the mapped bits $I_1$ has larger bits than output bits $[d_{1,1}\ d_{1,2}]$ from the mapping unit. For example, when 2 bits $[d_{1,1}\ d_{1,2}]$ are output, the mapped bits may be 4 bits. The outputs from the mapping units 151 and 152 can be represented by Equation 1 shown below, wherein $H_1$ and $H_2$ may be a coset leader generation matrix. For example, $H_1$ and $H_2$ may have a form of gray mapping as represented by Equation 2 shown below:

$$I_1 = [d_{1,1}\ d_{1,2}] * H_1 \quad \text{(Equation 1)}$$
$$I_2 = [d_{2,1}\ d_{2,2}] * H_2$$

$$H_1 = \begin{bmatrix} 0 & 1 & 0 & 1 \\ 1 & 0 & 1 & 0 \end{bmatrix} \quad \text{(Equation 2)}$$

$$H_2 = \begin{bmatrix} 0 & 0 & 0 & 1 \\ 0 & 0 & 1 & 0 \end{bmatrix}$$

The modulo calculation unit 155 adds the output signals $I_1$ and $I_2$ from the mapping units 151 and 152, and perform modulo-2(mod 2) calculation to generate a signal $I_{12}$ of the lower layer group.

The multi-dimensional modulation unit 157 receives the signal $I_{12}$ of the lower layer group and performs multi-dimensional modulation using the multi-dimensional lattice to generate a modulation symbol $m_{12}$. The multi-dimensional modulation unit 157 modulates some bits of the signal $I_{12}$ of the lower layer group such that they correspond to a two-dimensional lattice, to generate one symbol and modulates the other remaining bits such that they correspond to the two-dimensional lattice, to generate another symbol, and combines the two symbols to generate combination information of the plurality of symbols corresponding to the lower layer group. For example, when the multi-dimensional modulation unit 157 receives the signal $I_{12}$ of the lower layer group having 4 bits, the multi-dimensional modulation unit 157 generates a first QPSK (Quadrature Phase-Shift Keying) symbol by using the first two bits and generates a second QPSK symbol by using the next two bits. The multi-dimensional modulation unit 157 combines the two QPSK symbols to generate four-dimensional symbol $m_{12}$. In this case, the multi-dimensional modulation refers to a combination of a plurality of symbols, and in particular, four-dimensional modulation refers to a combination of two two-dimensional symbols.

A method for modulating the upper layer group including the two upper layers may be the same as the modulation of the lower layer group. The mapping units 153 and 154 map the interleaved bits ($d_{3,1}, d_{3,2}, d_{4,1}, d_{4,2}$) to generate bits for modulation, i.e., mapped bits $I_3$ and $I_4$. In this case, the corset reader matrices $H_3$ and $H_4$ of the mapping units 153 and 154 may correspond to the corset reader generation matrices $H_1$ and $H_2$ of the mapping units 151 and 152, respectively. The modulo operation unit 156 adds the output signals $I_3$ and $I_4$ from the mapping units 153 and 154, and performs modulo 2 calculation to generate a signal $I_{34}$ of the upper layer group. The multi-dimensional modulation unit 158 receives the signal $I_{34}$ of the upper layer group and performs multi-dimensional modulation thereon by using a multi-dimensional lattice to generate a modulation symbol $m_{34}$.

The gain control units 171 and 172 control gains gain $g_{12}$ and $g_{34}$ of the modulation symbols $m_{12}$ and $m_{34}$ of the respective layer groups to generate gain-controlled modulation symbols $s_{12}$ and $s_{34}$ of the respective layer groups. In this case, the gain controllers 171 and 172 adjust the intervals between constellations of the modulation signals by controlling the gains.

The adding unit 190 adds the modulation symbols $s_{12}$ and $s_{34}$ of the respective layer groups to generate a transmission symbol (s). When the respective modulation symbols $s_{12}$ and $s_{34}$ are symbols obtained by combining two QPSK symbols, the adding unit 190 adds the first QPSK symbols of the respective modulation symbols $s_{12}$ and $s_{34}$ to generate one 16QAM symbol [s(1)] and adds the second QPSK symbols to generate another 16QAM symbol [s(2)]. The transmission symbol (s) may include 256 symbols and can be transmitted as two 16 QAM signals as represented by Equation 3 shown below:

$$s = \begin{bmatrix} s(1) \\ s(2) \end{bmatrix} = \begin{bmatrix} s^R(1) \\ s^I(1) \\ s^R(2) \\ s^I(2) \end{bmatrix} \quad \text{(Equation 3)}$$

In Equation 3, $s^R(1)$ and $s^I(1)$ indicate a real number part and an imaginary number part of $s(1)$, respectively, and $s^R(2)$ and $s^I(2)$ indicate a real number part and an imaginary number part of $s(2)$, respectively.

The layered transmission apparatus 100 may transmit the transmission symbol (s) by using two radio resources through one antenna or may transmit the transmission symbol (s) by using one radio resource through two antennas.

Figure 2:
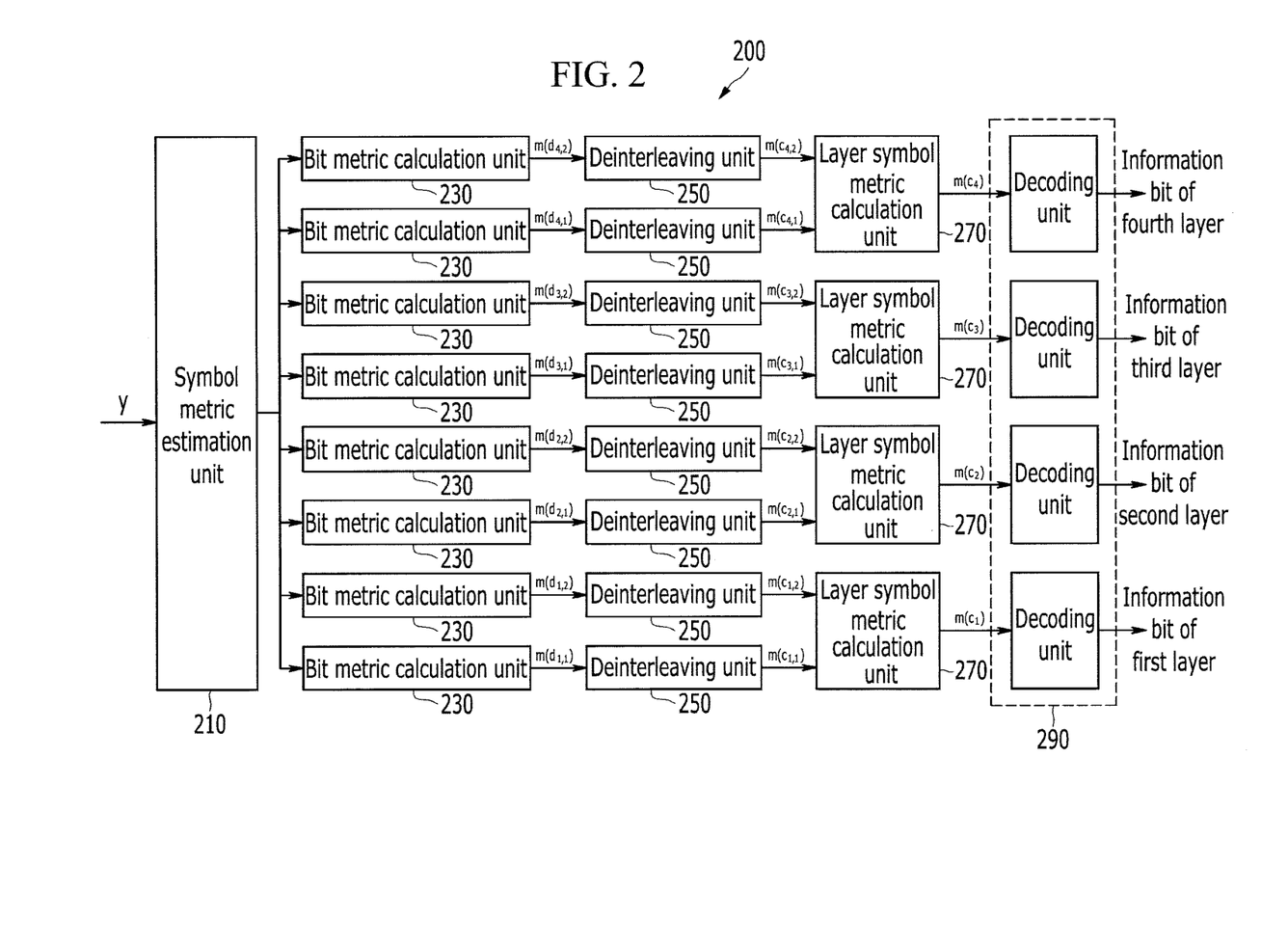
FIG. 2 is a schematic block diagram of a reception apparatus according to an exemplary embodiment of the present invention.

FIG. 2 is a schematic block diagram of a reception apparatus according to an exemplary embodiment of the present invention.

With reference to FIG. 2, a reception apparatus 200 includes a symbol metric estimation unit 210, a plurality of bit metric calculation units 230, a plurality of deinterleaving units 250, a plurality of layer symbol metric calculation units 270, and a plurality of decoding units 290. The plurality of bit metric calculation units 230 and the plurality of deinterleaving units 250 correspond to corresponding bits, namely, the interleaved bits generated by the layered transmission apparatus 100, and the plurality of layer symbol metric calculation units 270 correspond to a plurality of layers, respectively.

The symbol metric estimation unit 210 estimates an overall symbol metric (s), which has been transmitted by the layered transmission apparatus 100, based on channel information (H) and a reception signal (y) between the layered transmission apparatus 100 and the reception apparatus 200. The reception signal (y) is represented by Equation 4 shown below:

The symbol metric estimation unit 210 calculates a symbol metric $[M(\hat{s})]$ with respect to 256 estimated symbols ($\hat{s}$) as represented by Equation 5 shown below. In this case, the symbol metric estimation unit 210 may calculate the symbol metric $[M(\hat{s})]$ by using the Euclidean distance of the reception signal (y) and a signal related to the estimated symbols ($\hat{s}$).

$$y = Hs + n \quad \text{(Equation 4)}$$

Here, H is channel information, s is a transmission symbol transmitted by the layered transmission apparatus 100, and n is noise.

$$M(\hat{s}) = \|y - H\hat{s}\|^2 = \|H(s - \hat{s}) + n\|^2 \quad \text{(Equation 5)}$$

When the transmission symbol (s) is transmitted by using two radio resources through one antenna, the channel information (H) can be represented by Equation 6 shown below, and when the transmission symbol (s) is transmitted by using one radio resource through two antennas, the channel information (H) can be represented by Equation 7 shown below.

$$H = \begin{bmatrix} h^R & -h^I & 0 & 0 \\ h^I & h^R & 0 & 0 \\ 0 & 0 & h^R & -h^I \\ 0 & 0 & h^I & h^R \end{bmatrix} \quad \text{(Equation 6)}$$

$$H = \begin{bmatrix} h^R_{11} & -h^I_{11} & h^R_{12} & -h^I_{12} \\ h^I_{11} & h^R_{11} & h^I_{12} & h^R_{12} \\ h^R_{21} & -h^I_{21} & h^R_{22} & -h^I_{22} \\ h^I_{21} & h^R_{21} & h^I_{22} & h^R_{22} \end{bmatrix} \quad \text{(Equation 7)}$$

In Equation 7, $h^R$ and $h^I$ denote a real number part and an imaginary number part of the channel estimation (H), respectively, and the matrix of Equation 7 denote channel information by a multi-input multi-output (MIMO) antenna.

The plurality of bit metric calculation units 230 obtain symbols related to the interleaved bits $d_{1,2}$, $d_{2,1}$, $d_{2,2}$, $d_{3,1}$, $d_{3,2}$, $d_{4,1}$, $d_{4,2}$) generated by the layered transmission apparatus 100 among the estimated symbol metrics $[M(\hat{s})]$, and determine a symbol closest to a reception signal among the related symbols, as bit metrics $[m(d_{1,1}), m(d_{1,2}), m(d_{2,1}), m(d_{2,2}), m(d_{3,1}), m(d_{3,2}), m(d_{4,1}), m(d_{4,2})]$ corresponding to the respective interleaved bits. For example, when the estimated symbol metrics $[M(\hat{s})]$ are denoted as 256 constellations, symbols which can be generated with the respective interleaved bits ($d_{i,j} = b \in \{0,1\}$), among the 256 constellations, are defined as $S_{i,j}^b$.

In this case, for example, when b is 0 and 1, the symbols $S_{i,j}^b$ include 128 constellations, respectively. The bit metric calculation unit 230 can obtain a bit metric having a minimum distance with the reception signal (y), among the symbols ($S_{i,j}^b$) which can be generated with the respective interleaved bits ($d_{i,j}$), as represented by Equation 8 shown below.

$$m(d_{i,j}^b) = \min_{\hat{s} \in S_{i,j}^b} \|y - H\hat{s}\|^2 = \min_{\hat{s} \in S_{i,j}^b} M(\hat{s}) \quad \text{(Equation 8)}$$

The plurality of deinterleaving units 250 bit-deinterleave the bit metric $[m(d_{i,j}^b)]$ of the corresponding interleaved bit ($d_{i,j}$) to calculate a metric $[m(c_{i,j}^b)]$ of a code bit ($c_{i,j}$).

The plurality of layer symbol metric calculation units 270 calculate a symbol metric $[m(c_i)]$ of the corresponding layer by using the code bit metric of the corresponding layer. The symbol metric $[m(c_i)]$ of the corresponding layer can be obtained as the sum of the code bit metrics of the corresponding layer, as represented by Equation 9 shown below.

$$m(c_i) = \sum_{j=1}^{2} m(c_{i,j}) \quad \text{(Equation 9)}$$

The plurality of decoding units 290 decode an information bit of the corresponding layer based on the corresponding layer symbol metric. In this case, each state of trellis has four branch information according to two code bits.

Figure 3:
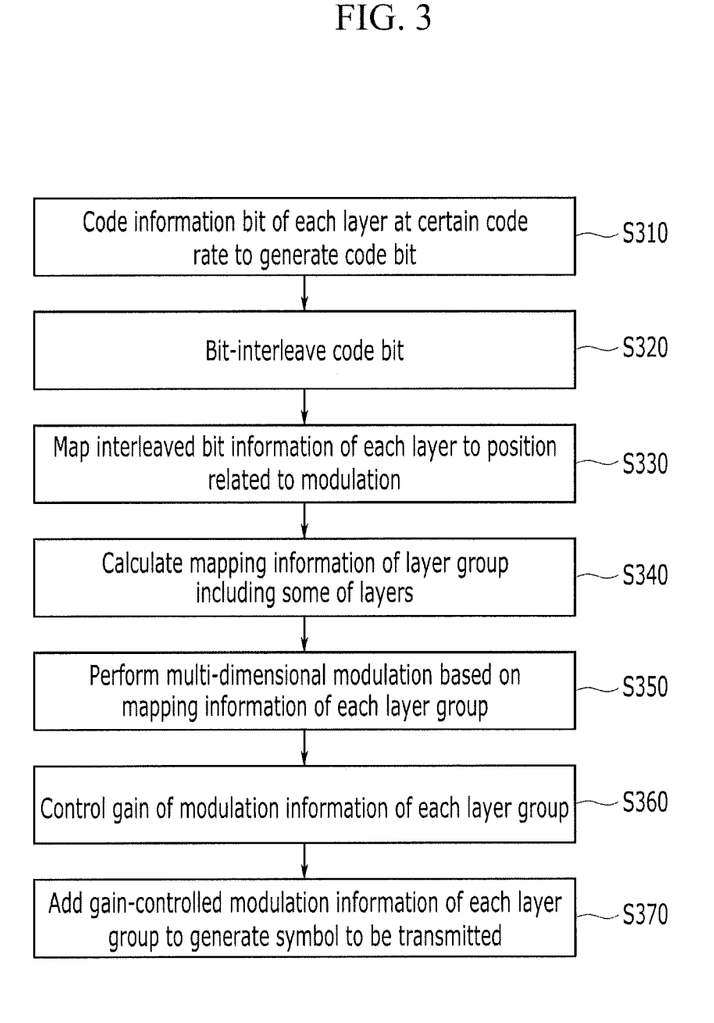
FIG. 3 is a flow chart illustrating the process of a layered transmission method according to an exemplary embodiment of the present invention.

FIG. 3 is a flow chart illustrating the process of a layered transmission method according to an exemplary embodiment of the present invention.

With reference to FIG. 3, the layered transmission apparatus 100 codes an information bit of each layer at a certain code rate to generate code bits (S310).

The layered transmission apparatus 100 bit-interleaves the code bits (S320).

The layered transmission apparatus maps interleaved bit information of each layer to modulation bits related to modulation by using a matrix (S330). For example, the layered transmission apparatus 100 may map the interleaved symbols of each layer by using a coset leader generation matrix having a gray mapping form.

The layered transmission apparatus 100 adds mapping information of some of the entire layers and performs modulo calculation thereon to calculate mapping information of a layer group including some of the layers (S340). For example, in case of transmitting four layers, the layered transmission apparatus 100 obtains mapping information of a lower layer group by adding mapping information of two lower layers, and obtains mapping information of an upper layer group by adding mapping information of two upper layers.

Thereafter, the layered transmission apparatus 100 modulates the mapping information of the respective layer groups to perform multi-dimensional modulation (S350). The layered transmission apparatus 100 generates a plurality of symbols by using the mapping information of the respective layer groups, and combines the plurality of symbols to generate multi-dimensional modulation symbols corresponding to the respective layer groups. For example, when the mapping information has 4-bit information, the layered transmission apparatus 100 modulates the first two bits such that they correspond to two-dimensional lattice to generate a first QPSK symbol, and modulates the other remaining two bits such that they correspond to the two-dimensional lattice to generate a second QPSK symbol. The layered transmission apparatus 100 then combines the two generated QPSK symbols to generate combination information of the plurality of symbols corresponding to the respective layer groups. In this case, the combination information of the plurality of symbols is the information obtained by combining the two QPSK symbols, which is a four-dimensional modulation symbol.

The layered transmission apparatus 100 controls the gain of the multi-dimensional modulation symbols, the modulation information of the respective layer groups, namely, information obtained by combining the plurality of symbols (S360).

The layered transmission apparatus 100 generates symbols to be transmitted by adding the modulation information of the respective layer groups (S370). In this case, in order to simultaneously transmit the plurality of layers, the layered transmission apparatus 100 adds symbols having different gains and transmits the same. For example, the layered transmission apparatus 100 may generate a first 16QAM symbol by adding the first QPSK symbols of the respective layer groups whose gains have been controlled, and generate a second 16QAM symbol by adding the second QPSK symbols of the respective layer groups whose gains have been controlled, combine the two 16QAM symbols, and transmit the same.

Figure 4:
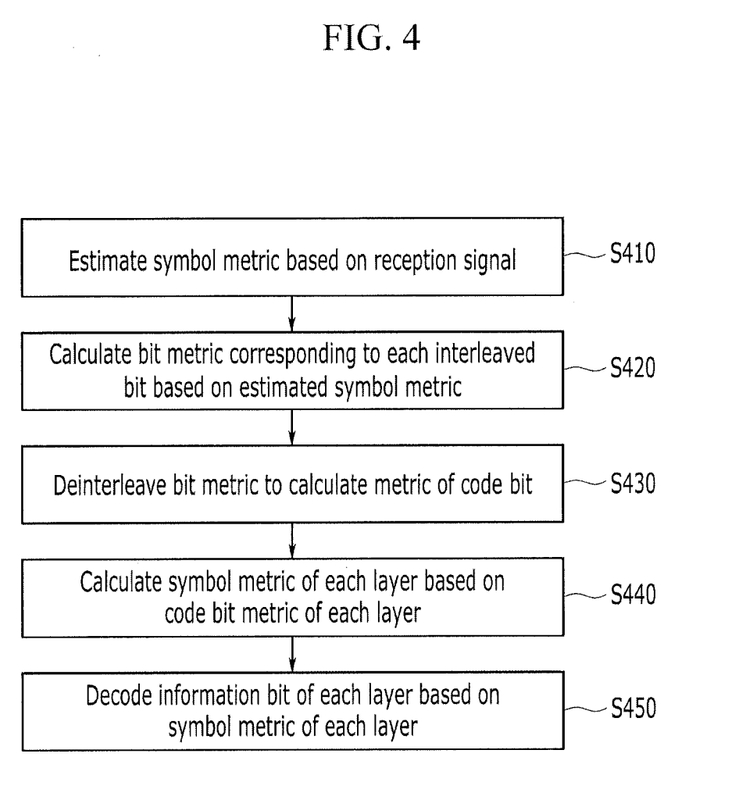
FIG. 4 is a flow chart illustrating the process of a reception method according to an exemplary embodiment of the present invention.

FIG. 4 is a flow chart illustrating the process of a reception method according to an exemplary embodiment of the present invention.

With reference to FIG. 4, the reception apparatus 200 estimates a symbol metric [M(ŝ)] transmitted by the layered transmission apparatus 100 based on a signal received from the layered transmission apparatus 100 (S410). The reception apparatus 200 estimates all the symbol metrics transmitted based on the distance difference between the reception signal (y) and the signal (Hŝ) related to the estimated symbol (ŝ) as shown in Equation 5 above.

The reception apparatus 200 calculates a bit metric [m($d_{i,j}^b$)] corresponding to the respective interleaved bits based on the estimated symbol metric (S420). In this case, the reception apparatus 200 calcualtse the bit metric corresponding to the respective interleaved bits based on the difference between the symbols related to the respective interleaved bits among the estimated symbol metrics and the reception signal.

The reception apparatus 200 deinterleaves the bit metric to calculate a metric [m($c_{i,j}^b$)] of a code bit (S430).

The reception apparatus 200 calculates the symbol metric [m($c_i$)] of each layer based on the code bit metric of each layer (S440). The reception apparatus 200 obtains the symbol metric [m($c_i$)] of each layer by adding the metrics of the respective code bits as represented by Equation 9 above.

The reception apparatus 200 decodes the information bit of each layer based on the symbol metric of each layer (S450).

As described above, according to exemplary embodiments of the present invention, the layered transmission apparatus 100 can increase the number of layers which can be simultaneously transmitted, and the reception apparatus 200 can simultaneously estimate the symbol metric of all the layers from a received signal and decode them by layer, thus reducing interlayer interference.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A layered transmission apparatus for transmitting information regarding a plurality of layers, the apparatus comprising:
   a plurality of coding units, which correspond to each of the plurality of layers, configured to code an information bit of a corresponding layer to generate code bits;
   a plurality of bit interleaving units, which correspond to each of the code bits, configured to bit-interleave a corresponding code bit to generate interleaved bits;
   a modulation unit configured to classify the plurality of layers into a plurality of layer groups, and modulate the plurality of the interleaved bits corresponding to each of the layer groups to generate a modulation symbol of each of the layer groups, wherein the modulation symbol is a multi-dimensional symbol which is generated by combining a plurality of symbols corresponding to the interleaved bits;
   a gain control unit configured to adjust an interval between a constellation of the modulation signal of each of the layer groups by controlling a gain of the modulation symbol of each of the layer groups; and
   an adding unit configured to add the gain-controlled modulation symbols by adding a first part of the gain-controlled modulation symbols of the plurality of layer groups together to generate a first transmission symbol and adding a second part of the gain-controlled modulation symbols of the plurality of layer groups together to generate a second transmission symbol.

2. The apparatus of claim 1, wherein the modulation unit comprises:
   a plurality of mapping units, which correspond to each of the plurality of layers, configured to map the interleaved symbol of a corresponding layer to bits for modulation; and
   a plurality of multi-dimensional modulation units which correspond to each of the plurality of layer groups,
   wherein each of the multi-dimensional modulation units modulates a combined signal obtained by combining output signals from mapping units belonging to a corresponding layer group, among the plurality of mapping units, to generate the modulation symbol.

3. The apparatus of claim 2, wherein the modulation unit further comprises:
   a plurality of modulo calculation units, which correspond to each of the plurality of layer groups,
   wherein each of the modulo calculation units adds output signals from the mapping units belonging to the corresponding layer group and performs a modulo calculation to generate the combined signal.

4. The apparatus of claim 2, wherein the mapping units use gray mapping.

5. The apparatus of claim 2, wherein each of the multi-dimensional modulation units generates a plurality of symbols from the combined signal of the corresponding layer group and combines the plurality of symbols to generate an N-dimensional modulation symbol of the corresponding layer group, and modulates some bits of the combined signal such that they correspond to an M-dimensional lattice, to generate the respective symbols, wherein N is a natural number greater than M.

6. The apparatus of claim 5, wherein the adding unit adds symbols of the same positions among the gain-controlled modulation symbols of the plurality of layer groups to generate the transmission symbol.

7. A method for transmitting information regarding a plurality of layers by a layered transmission apparatus, the method comprising:
- coding an information bit of a corresponding layer among the plurality of layers to generate code bits;
- bit-interleaving each code bit to generate an interleaved bit;
- classifying the plurality of layers into a plurality of layer groups and generating a modulation symbol of each layer group based on the interleaved bits corresponding to each layer group, wherein the modulation symbol is a multi-dimensional symbol which is generated by combining a plurality of symbols corresponding to the interleaved bits;
- adjusting an interval between a constellation of the modulation signal of each layer group by controlling the gain of the modulation symbol by layer group; and
- adding a first part of the gain-controlled modulation symbols of the plurality of layer groups together to generate a first transmission symbol and adding a second part of the gain-controlled modulation symbols of the plurality of layer groups together to generate a second transmission symbol.

8. The method of claim 7, wherein the generating of the modulation symbol of each layer group comprises:
- mapping the interleaved bits of the corresponding layer bits for modulation; and
- modulating a combined signal obtained by combining the mapped bits corresponding to the respective layer groups to generate a modulation symbol which has been multi-dimensionally modulated.

9. The method of claim 8, wherein the generating of the modulation symbol of each layer group further comprises:
- adding the mapped bits of the layers belonging to each layer group and perform a modulo calculation to generate the combined signal.

10. The method of claim 8, wherein, in the mapping, gray mapping is used.

11. The method of claim 8, wherein, in the generating of the multi-dimensionally modulated modulation symbol, a plurality of symbols are generated from the combined signal, and the plurality of symbols are combined to generate an N-dimensional modulation symbol of each layer group, and some bits of the combined signal are modulated to correspond to an M-dimensional, which is lower than N dimension, lattice to generate each symbol.

12. The method of claim 11, wherein, in the generating of the transmission symbol, the transmission symbol is generated by adding symbols at the same positions among the gain-controlled modulation symbols of the plurality of layer groups.

\* \* \* \* \*